Sept. 4, 1945. C. B. SPASE 2,384,405
FRICTION CLUTCH
Filed July 29, 1943

INVENTOR
CHARLES B. SPASE
BY
Bodell and Thompson
ATTORNEYS

Patented Sept. 4, 1945

2,384,405

UNITED STATES PATENT OFFICE 2,384,405

FRICTION CLUTCH

Charles B. Spase, Nedrow, N. Y., assignor to Lipe-Rollway Corporation, Syracuse, N. Y., a corporation of New York Application July 29, 1943, Serial No. 496,527

3 Claims. (Cl. 192—68)

This invention relates to friction clutches, such as are used in the automotive vehicles, and has for its object a clutch including a pressure ring and a throw-out collar or sleeve in which the clutch spring acts or thrusts directly on the pressure ring in one direction at one end and in the opposite direction on the throw-out collar at its other end, together with clutch lever mechanism for transferring and reversing the movement of the clutch collar to the pressure ring through reduction leverage, and further has for its object a clutch in which the reduction leverage is so arranged that the centrifugal force on part of it opposes or cancels out the effect of the centrifugal force on the other part, thus rendering the operation of the throw-out collar by the foot pedal particularly easy, because the operator does not have to overcome the centrifugal force, this latter feature being of advantage with and without the spring arrangement.

It further has for its object a construction in which the reduction leverage includes a toggle which breaks or folds radially outward and moves under the influence of the clutch spring radially inward to engage the clutch but stops short of straightened position when the clutch is fully engaged, so that the clutch automatically compensates for wear.

It further includes this arrangement of the toggle relatively to the clutch levers or the long arms thereof, in such a manner that the centrifugal force effective on the longer arms of the clutch levers opposes and cancels out the effect of the centrifugal force on the toggle.

The invention consists in the novel features and in the combinations and constructions hereinafter set forth and claimed.

In describing this invention, reference is had to the accompanying drawing, in which like characters designate corresponding parts in all the views.

Figure 1:
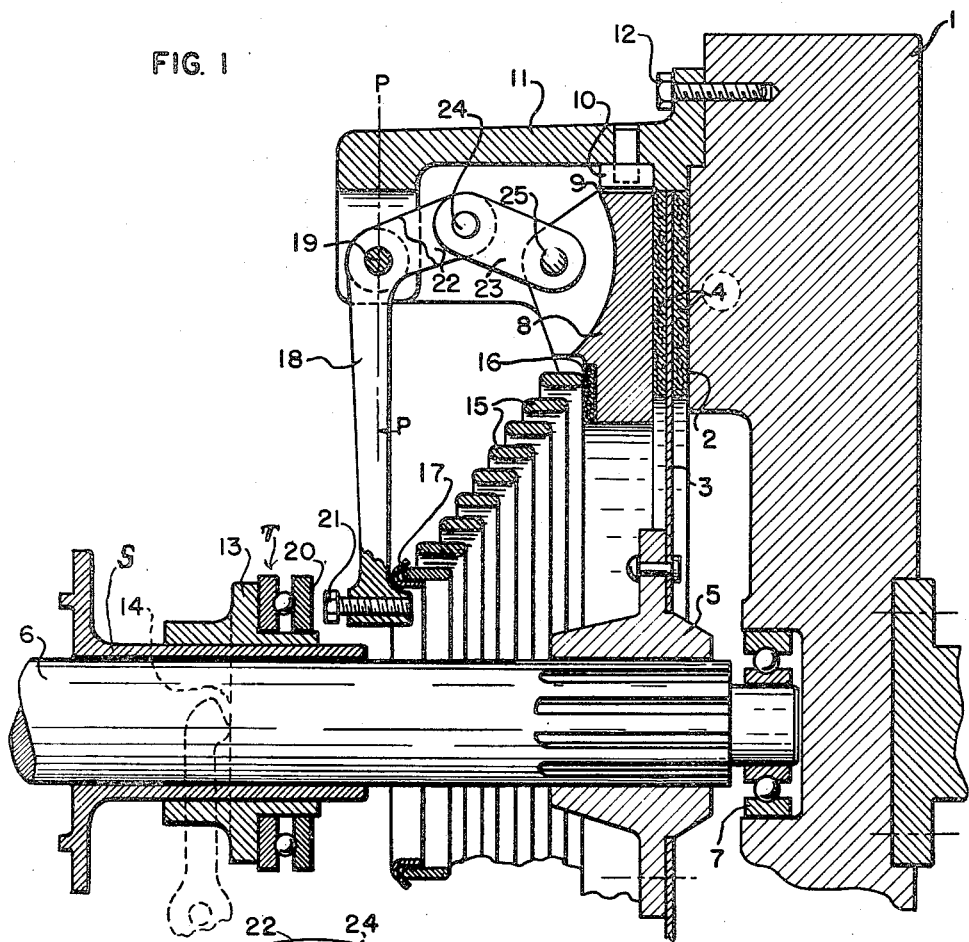
Figure 1 is a fragmentary longitudinal sectional view of a clutch embodying this invention.

This clutch comprises, generally, driving and driven members, a pressure ring rotatable with the driving member and coacting with the driven member to clutch the same in driving engagement with the driving member, a throw-out sleeve, clutch mechanism between the throw-out sleeve and the pressure ring and a clutch spring acting on the pressure ring to engage the clutch.

The driving member 1 is here shown as a fly wheel, this having a clutch face 2 on its rear side. 3 designates the driven member, which is a clutch plate having friction disks 4 on opposite sides of its rim and also a hub 5 slidably splined on the driven or clutch shaft 6, this usually having a pilot bearing at 7 in the driving member 1. 8 designates the pressure ring rotatable with the fly wheel, it being here shown as having peripheral teeth or lugs 9 interlocked with complemental lugs 10 having stems extending into brackets 11 which are secured to the rear face of the fly wheel 1 as by bolts 12. The brackets 11 project rearwardly from the fly wheel and form supports for the clutch levers to be presently described.

13 designates the throw-out sleeve, this being slidable on a sleeve S and thrusting through an anti-friction thrust bearing T. It is operated in any of the usual ways from the clutch pedal, not shown. Any suitable thrust bearing means may be provided for reducing the friction between the throw-out yoke and the throw-out sleeve. Such detail features form no part of this invention. The throw-out collar 13 is provided with a peripheral groove 14 for receiving the inner ends of the clutch levers.

15 designates the clutch spring, this being shown as a coiled conical spring pressing at its large end at 16 directly against the pressure ring 8 and at its smaller or apex end against a ring 17 which thrusts against the inner ends of the levers 18, so that the spring thrusts in opposite directions against the pressure ring 8 and levers 18.

Figure 2:
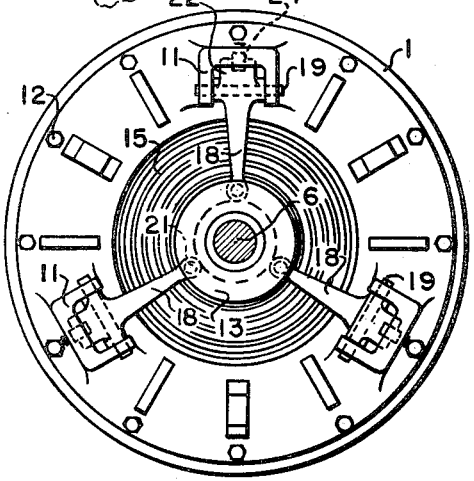
Figure 2 is a rear elevation on a reduced scale of the driving member with the brackets to which the clutch levers are pivoted shown.

The clutch mechanism between the throw-out sleeve and the pressure ring for transferring the spring pressure to the pressure ring, as here shown, comprises a series of angle levers, as the levers 18, each pivoted at its angle at 19 to one of the brackets 11 in the rear of the pressure ring 8 and having a long arm extending radially inward from the pivotal point 19 and coacting with the rings 20 of the thrust bearing T, each lever having a suitable adjusting screw 21 at its inner end. The screw 21 is normally spaced from ring 20 so that when the clutch is engaged, there is no tendency to rotate the throw-out collar 13 or the thrust bearing T. The sleeve S is fixed to the gear housing the rear of the clutch or to the rear wall of the clutch housing, not shown. It forms a bearing for the clutch shaft 6, which may be a stem gear, or the input shaft of the gearing. The angle lever also includes a shorter arm 22 forming one link of the toggle, the other link 23 of which is pivoted at 24 to the short arm and at 25 to the pressure ring 8, the pivot point 24 forming the joint of the toggle. The toggle folds radially outward, and hence the spring 15 tends to straighten the toggle, moving the joint 24 radially inward, thus augmenting the direct force of the spring 15 on the pressure ring 8 through the reduction leverage consisting of the lever 18 and toggle link 22. There is an annular series of the clutch mechanism including these levers 18 equally spaced, shown in Figure 2. The short lever arm 22 and the link 23 constitute, in a general sense, motion transmitting means between the long lever arm and the pressure ring.

Each lever 18 is located with the greater portion thereof on one side of a radial plane passing through the axis 19 of the lever or levers. This plane may be called the fulcrum plane and is designated by the letters PP. The shorter arms 22 of the levers and also the links 23 are arranged on the opposite side of such plane PP. Hence, the effect of the centrifugal force on the longer arms of the levers 18 opposes the effect of the centrifugal force on the shorter arms 22 or link 23, and this opposition is so balanced that the centrifugal force on one side of the plane PP practically cancels out the centrifugal force on the other side, thus rendering the throwing out of the clutch by means of a foot pedal particularly easy, because the operator is not working against centrifugal force and is working through a reduction leverage against the spring 15 only. The leverage herein is preferably four to one.

By reason of this spring arrangement and the reduction leverage, as the four to one ratio, the total pressure with the spring of a given strength is greatly increased in engaging the clutch and the effort required to disengage the clutch relatively small. For instance, assume that the spring has a force of two hundred pounds, a leverage ratio four to one. The coefficient of the angle of the toggle at the initial adjustment thereof is 1.25. Then the total pressure equals 200 x 4 x 1.25 plus 200 equals 1200 lbs. As the clutch faces wear, the toggles move under the action of the clutch spring farther toward a straight line. This increases the coefficient of the toggle angle and more than compensates for loss due to elongation of the clutch spring, as the clutch faces wear.

What I claim is:

1. In a clutch, the combination of driving and driven members, a pressure ring rotatable with the driving member and coacting with the driven member to clutch the same in driving engagement with the driving member, clutch engaging and throw-out means including reversing leverage, a clutch spring acting in opposite directions against the pressure ring and the reversing and reduction leverage serving to transmit the force of the spring to the pressure ring in the same direction that the pressure ring is pressed directly by the spring, and a throw-out collar coacting with said leverage, the reduction and reversing leverage also including a toggle foldable to disengage the clutch and movable toward a straight dead center line to engage the clutch, the toggle stopping short of fully straightened position when the clutch is engaged.

2. In a clutch, the combination of driving and driven members, a pressure ring rotatable with the driving member and coacting with the driven member to clutch the same in driving engagement with the driving member, a throw-out collar, clutch mechanism between the throw-out collar and the pressure ring, the clutch mechanism including an angle lever pivoted at the angle thereof and including a short arm and a long arm extending radially inward and coacting with the throw-out collar, the short arm constituting one link of the toggle and a toggle link pivoted to the short arm and to the pressure ring, and a clutch spring acting in opposite directions against the pressure ring and the long arm of the lever.

3. In a clutch, the combination of driving and driven members, a pressure ring rotatable with the driving member and coacting with the driven member to clutch the same in driving engagement with the driving member, a throw-out sleeve, clutch mechanism between the throw-out sleeve and the pressure ring, the clutch mechanism including an angle lever pivoted at the angle thereof and including a short arm and a long arm extending radially inward and coacting with the throw-out sleeve, the short arm constituting one link of the toggle and a toggle link pivoted to the short arm and to the pressure ring, the long arm of the lever and the short arm thereof together with the toggle link being so arranged relatively to the pivotal axis of the lever that the centrifugal force effective on the long arm opposes the centrifugal force effective on the short arm and the toggle link, and a clutch spring acting in opposite directions against the pressure ring and the long arm of the lever.

CHARLES B. SPASE.